(12) United States Patent
Uwakubo

(10) Patent No.: US 6,513,011 B1
(45) Date of Patent: Jan. 28, 2003

(54) MULTI MODAL INTERACTIVE SYSTEM, METHOD, AND MEDIUM

(75) Inventor: Shinichi Uwakubo, Tokyo (JP)

(73) Assignee: NEC Corporation, Tokyo (JP)

( * ) Notice: Subject to any disclaimer, the term of this patent is extended or adjusted under 35 U.S.C. 154(b) by 180 days.

(21) Appl. No.: 09/585,288

(22) Filed: Jun. 2, 2000

(30) Foreign Application Priority Data

Jun. 4, 1999 (JP) ............................................. 11-158172

(51) Int. Cl.[7] .............................................. G10L 21/00
(52) U.S. Cl. ...................................... 704/275; 704/270
(58) Field of Search ............................... 704/270, 27 S, 704/272, 257, 9; 707/1

(56) References Cited

U.S. PATENT DOCUMENTS

| | | | | |
|---|---|---|---|---|
| 5,357,596 A | * | 10/1994 | Takebayashi et al. | 704/275 |
| 5,577,165 A | * | 11/1996 | Takebayahsi et al. | 704/275 |
| 5,884,249 A | * | 3/1999 | Namba et al. | 704/9 |
| 5,918,222 A | * | 6/1999 | Fukui et al. | 707/1 |
| 6,012,030 A | * | 1/2000 | French St. George et al. | 704/275 |
| 6,018,711 A | * | 1/2000 | French St. George et al. | 704/275 |
| 6,144,938 A | * | 11/2000 | Surace et al. | 704/257 |
| 6,175,772 B1 | * | 1/2001 | Kamiya et al. | 700/31 |
| 6,275,806 B1 | * | 8/2001 | Pertrushin | 704/272 |
| 6,311,159 B1 | * | 10/2001 | Van Tichelen et al. | 704/275 |

FOREIGN PATENT DOCUMENTS

| | | |
|---|---|---|
| JP | 6-12401 | 1/1994 |
| JP | 8-234789 | 9/1996 |

* cited by examiner

*Primary Examiner*—Susan McFadden
(74) *Attorney, Agent, or Firm*—Sughrue Mion, PLLC

(57) ABSTRACT

A multi modal interactive device which can supply a conversation between the device and user with proper length of a pause which is determined according to types of the user.

12 Claims, 5 Drawing Sheets

FIG. 5

| USER TYPE | USER STATE | | | TIMING |
|---|---|---|---|---|
| | SEX | AGE | | |
| 1 | MALE | TWENTIES | 0 | 0.3 |
| ... | ... | ... | ... | ... |
| 15 | FEMALE | TEENS | 5 | 0.2 |

MULTI MODAL INTERACTIVE SYSTEM, METHOD, AND MEDIUM

BACKGROUND OF THE INVENTION

1. Field of the Invention

The invention relates to an interactive information input/output system and, in particular, to a multi modal interactive system (might be simply called a multi modal system), method, and a computer readable recording medium for use in the multi modal system.

2. Description of the Related Art

Conventionally, a multi modal system has been proposed which can get necessary information by monitoring a voice signal and a usual gesture which is given by people. This system serves as an interactive machine between an information processing apparatus and many people and is very helpful to facilitate to use the information apparatus for many people. Further, some information apparatus are often operable as personified agents to interface with users and the users can easily handle the apparatus.

Also, a pseudo emotion device is disclosed in Japanese Laid Open Publication No. H06-12401 (namely, 12401/1994). The emotion imitating device makes an agent behave in a manner similar to human beings by using a pseudo emotion model and can achieve smooth information transmission.

Further, an integrated recognition interactive device is also disclosed in Japanese Laid Open Publication No. H08-234789 (namely, 234789/1996). The integrated recognition interactive device can have a more natural conversation by collecting or gathering various information which includes time information and information selected from a plurality of channels based on information from a multi modal interactive database.

In each of the above prior multi modal interactive devices, there is a problem that the prior devices can not follow changes of a length of a pause (timing) in a conversation. As a result, the prior device undesirably provides unnatural conversations to its users.

The length of the pause may depend on each user. On the other hand, a recognition time of the prior device is constant and, as a result, the length of the pause is longer than or shorter than the recognition time of the prior device.

Also, the length of the pause generally changes according to user's age, sex, and personality etc.

Further, the length of the pause may dynamically change based on the situation of the user, or transition of the user's conversation.

SUMMARY OF THE INVENTION:

Therefore, it is an object of the invention to provide a multi modal interactive device which can realize a natural conversation with users by considering a proper length of a pause (timing) to the users according to types of the users.

According to a first aspect of the invention, there is provided a multi modal interactive device which comprises an input unit which inputs information related to a user, a recognition unit which recognizes the information obtained by the input unit, an integrate process unit which determines an intention of the user from the recognition result from the recognition unit, a reaction generating unit which generates a reaction which corresponds to the intention of the user, a storing device which stores a timing for each user state, a conversation managing unit which determines a timing on the basis of the user state with reference to the storing device, and an output unit which outputs the reaction to the user based on the determined timing.

According to a second aspect of the invention, there is provided a method of providing with a multi modal conversation. The method comprises the steps of receiving information related to a user, recognizing the information, determining an intention of the user from the recognition result, generating a reaction which corresponds to the intention of the user, preparing a timing for each user state, determining a timing on the basis of the user state, and supplying the user with the reaction based on the determined timing.

According to a third aspect of the invention, there is provided a recording medium readable by a computer, tangibly embodying a program of instructions executable by the computer to perform a method of providing a multi modal conversation. The method comprises the steps of receiving information related to a user, recognizing the information, determining an intention of the user from the recognition result, generating a reaction which corresponds to the intention of the user, preparing a timing for each user state, determining a timing on the basis of the user state, and supplying the user with the reaction on the determined timing.

BRIEF DESCRIPTION OF THE DRAWINGS

FIG. 5 shows an example of contents of a user state storing unit of the invention.

Figure 1:
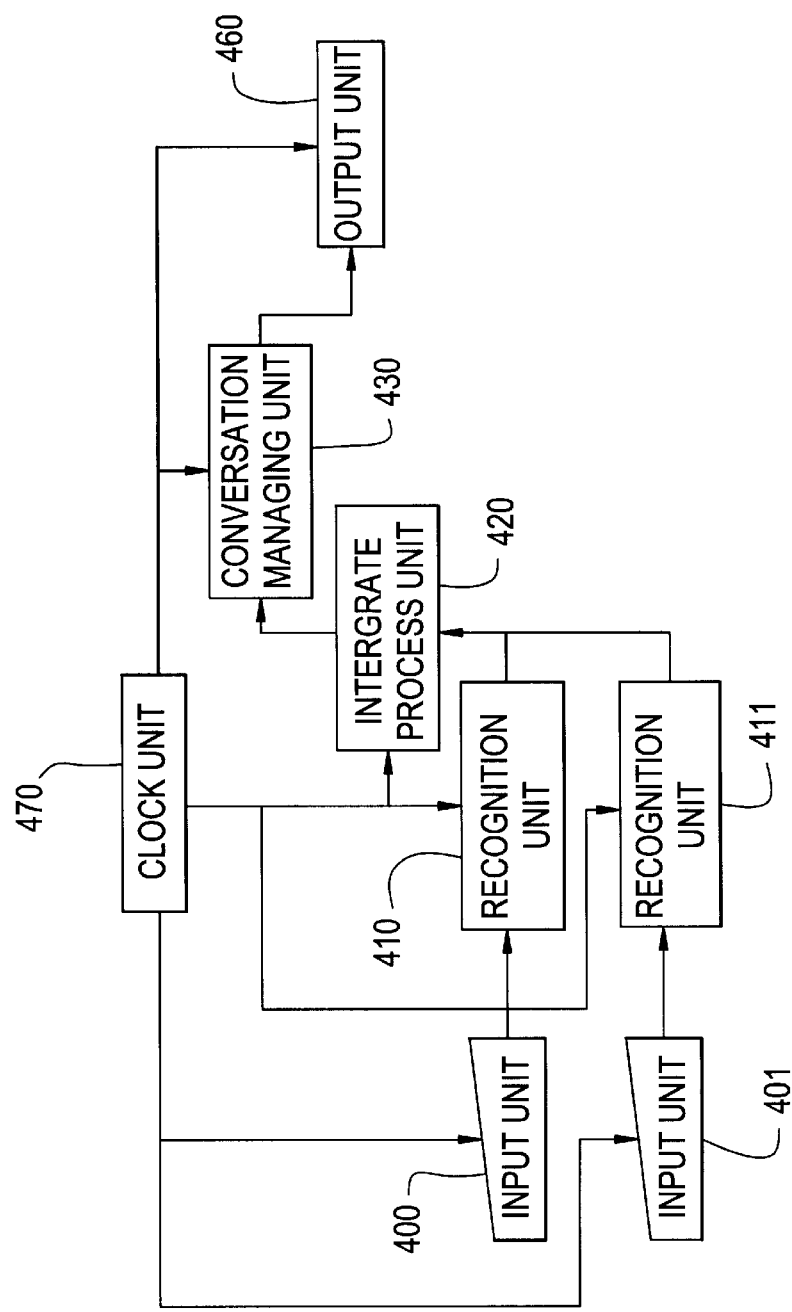
FIG. 1 shows a block diagram of a prior multi modal interactive device.

DESCRIPTION OF TE REFERRED EMBODIMENT:

At first, description is made about the prior multi modal interactive device with reference to FIG. 1 The multi modal interactive device includes a first input unit 400, a second input unit 401, a first recognition unit 410, a second recognition unit 411, an integrate process unit 420, a conversation manage unit 430, an output unit 460, and a clock unit 470.

The input unit 400 and the second input unit 401 input multi modal information. Such information may include a information user unconsciously sends and/or information the user consciously sends. Specifically, the multi modal information may be information which is concerned with a voice signal, a location of the user, the user's eyes, an expression of the user's face, and motion of the user's body.

Each of the first recognition unit 410 and the second recognition unit 411 is operable in accordance with an algorithm for processing or recognizing data from the corresponding input unit (the first input unit 400 or the second input unit 401), and provides a recognition result to the integrate process unit 420.

The integrate process unit 420 integrates recognition results supplied from a plurality of recognition units in parallel and consequently recognizes an intention of a user. The conversation manage unit 430 manages a proper conversation based on the recognized intention of the user. The output unit 460 provides information from the integrate process 420 to the user.

The clock unit 470 clocks or measures the start time, the end time, and the time necessary for processes. Such processes may be executed by the first input unit 400, the second input unit 401, the first recognition unit 410, the second recognition unit 411, the integrate process unit 420, the conversation manage unit 430, and the output unit 460.

Figure 2:
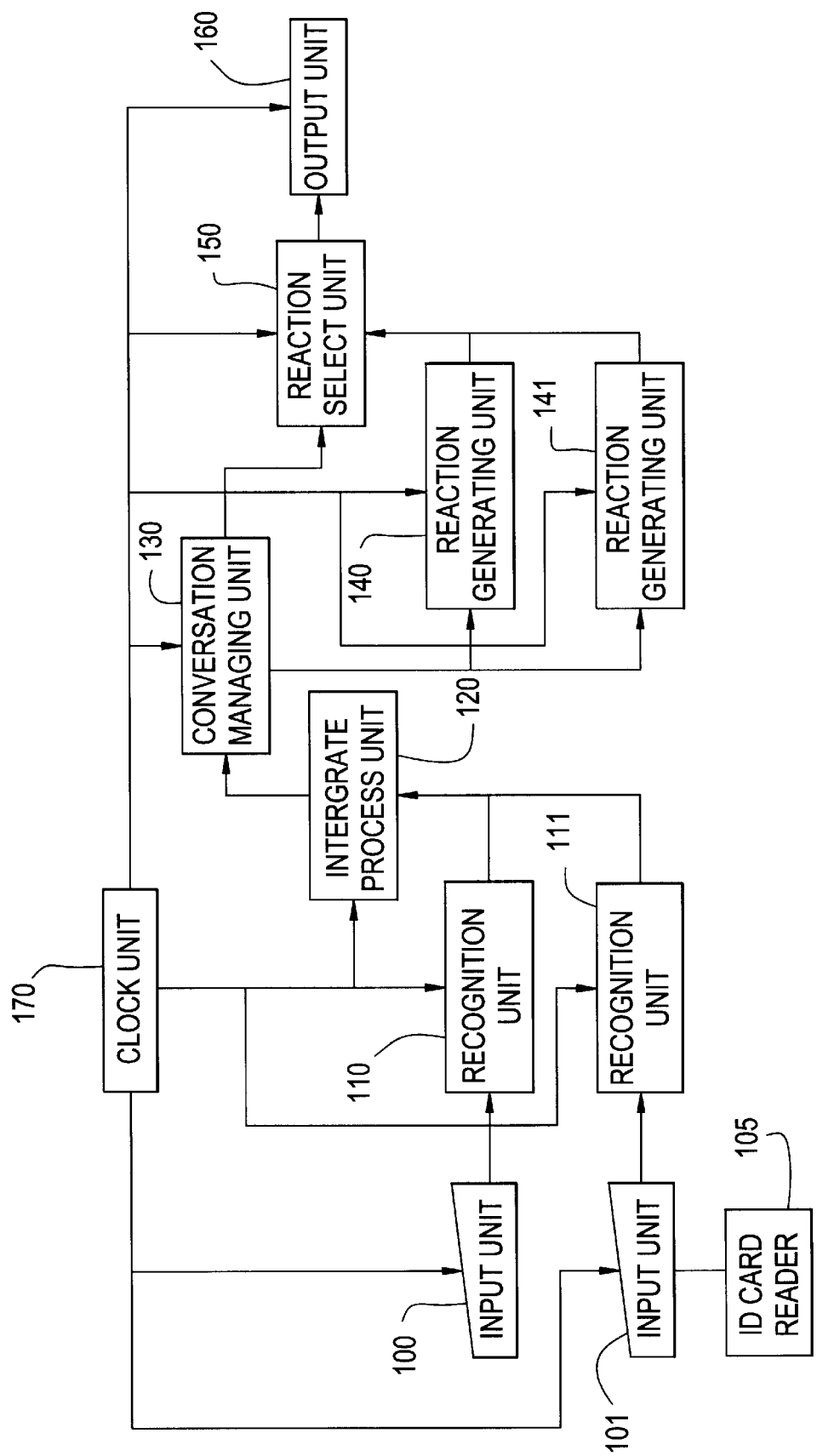
FIG. 2 shows a block diagram of a multi modal interactive device according to a first embodiment of the invention.

Next, a multi modal interactive device according to a first embodiment of the invention is explained with reference to FIG. 2.

The multi modal interactive device includes a first input unit 100, a second input unit 101, a first recognition unit 110, a second recognition unit 111, an integrate process unit 120, a conversation manage unit 130, a first reaction generating unit 140, a second reaction generating unit 141, a reaction select unit 150, an output unit 160, and a clock unit 170. Comparing with the above prior multi modal interactive device shown in FIG. 1, the illustrated interactive system is similar to the prior device except that the first reaction generating unit 140, the second reaction generating unit 141, and the reaction select unit 150 are newly added to the interactive device illustrated in FIG. 2.

Conscious or unconscious information which a user expresses consciously or unconsciously is supplied to the first input unit 100 and the second input unit 101. Each of the conscious information and the unconscious information includes, for example, voice signal, a location of the user, the user's eyes, an expression of the user's face, and motion of the user's body.

The multi modal interactive device may include only one input unit or more input units. The input unit may be, for example, a microphone, a camera, a keyboard, a mouse, and a touch panel.

Each of the first recognition unit 110 and the second recognition unit 111 has an algorithm applied to input data of the corresponding input unit (the first input unit 100 or the second input unit 101), and recognizes the input data using the algorithm.

When the input unit is configured to input a voice signal of a user (for example, a microphone), the corresponding recognition unit recognizes the voice signal using known voice signal recognition software (algorithm). Herein, if the user says "hello" toward the input unit, the recognition unit provides or recognizes a character string "hello" as a recognition result to the integrate process unit.

Similarly, when the input unit captures an image of the user's face, the corresponding recognition unit provides, for instance, a direction of the user's face to the integrate process unit 120.

The integrate process unit 120 integrates the recognition results supplied from a plurality of recognition units in parallel, consequently recognizes an intention of the user.

For example, if the integrate process unit 120 receives a character string which the user talks and a fact that the user talks toward the input unit, the integrate process unit recognizes that the user intends to speak to the multi modal interactive device with words of the character strings or the user intends to instruct the device to do what is denoted by the character strings.

Alternatively, if the integrate process unit 120 receives character strings which the user talks and a fact that the user talks toward his/her company beside him/her rather than the input unit, the integrate process unit 120 recognizes that the user does not intend to interact with the multi modal interactive device and the device does not react to the action of the user.

The conversation manage unit 130 determines a proper reaction according to the recognized intention of the user. The conversation manage unit 130 also determines, according to a type of the user, a proper timing to present the proper reaction to the user. The type of the user may be determined from the user's face image captured by the input unit through the recognition unit or an ID card, read by ID card reader 105, which is used when the user starts interacting with the multi modal interactive device.

Here, the term "timing" means a time necessary until a reaction of the multi modal interactive device is presented on the output unit in a desired natural manner in response to a user's action. The device manages the time (timing) as a time period (duration) from a time instant when the user's action is received by the input unit to another time instant when the reaction corresponding to the user's action is presented to the output unit (that is, to the user). Therefore, the device can make natural conversation with the user by skillfully controlling the timing.

To do this, the conversation manage unit 130 supplies contents related to the determined proper reaction to the first reaction generate unit 140 and the second reaction generate unit 141. The contents include instructions to control animation images expressing a virtual pseudo character with utterance, bitmap data, sound data, and an external device which can be connected to the multi modal interactive device.

At Also, the conversation manage unit 130 may instruct the reaction generating units to generate reactions according to the attribute of the user. For example, when the user is a man, the corresponding reaction is generated using woman's image and voice.

Further, the conversation manage unit 130 supplies the reaction select unit 150 with a method of selecting a reaction and a limit time of sending the selected reaction.

Here, the "limit time" is assigned so as to present the reaction to the user after lapse of the "timing". That is, a relationship between the above "timing" and the "limit time" may be described as follows.

The "timing" is equal to the "limit time" and a time required to present the reaction by the output device 160.

The multi modal interactive device may include only one reaction generating unit or more reaction generating units. Each of them generates reaction to provide the output unit 150 on the basis of instruction of the conversation manage unit 130.

In this example, there are two reaction generating units, and for example, one generates 3D image denoting the proper reaction provided by the conversation manage unit 130, and the other generates simple character strings expressing the proper reaction, according to the instruction from the conversation manage unit 130.

As described above, the first reaction generating unit 140 and the second reaction generating unit 141 generate reactions, but the units 140, 141 may suspend their own processes on the basis of instruction from the conversation manage unit 130. This is because when the following input is immediately given, the reaction which is currently being generated becomes unnecessary and another reaction become necessary.

The reaction select unit 150 selects the most proper information from the generated reactions by the reaction generating units (140, 141) on the basis of the method of selecting a reaction and the limit time of sending the selected reaction from the conversation manage unit and supplies the selected reaction to the output unit 160. The output unit 160 supplies the information of the reaction to the user.

For example, when the selected reaction is configured by only a voice signal, a speaker is used as the output unit 160 and sound which corresponds to the voice signal is given from the speaker to the user. When the selected reaction is configured by 3D images and a voice signal, a speaker and a monitor are used as the output unit 160 and sound and images are given therefrom.

Even if more than one reaction generating units are used, a reaction from one reaction generating unit is adopted as being sent to the output unit 160. Therefore, the reaction select unit 150 selects one reaction among reactions sent until the limit time from each reaction generating unit, based on the priority of the method from the conversation manage unit 130. For example, when three reactions are generated until the limit time (a first reaction is configured by 3D polygon image, a second reaction is configured by 2D animation image, and the other is configured by simple character strings) and when a priority (defined by the method of selecting a reaction) of the 3D polygon image is higher than that of the other expressions, the first reaction is selected to be sent to the output device 160.

Although each of three reaction generating units starts to generate a reaction, only two reactions may be provided. This is because generation of a reaction is not done within the limit time due to an excessive amount of calculation in a reaction generating unit.

The clock unit 170 clocks the start time of processing, the end time of processing, and processing time, for the first input unit 100, the second input unit 101, the first recognition unit 110, the second recognition unit 111, the integrate process unit 120, the conversation manage unit 130, the first reaction generating unit 140, the second reaction generating unit 141, the reaction select unit 150, and the output unit 160. Therefore, the "timing" can be calculated and the "limit time" can be estimated.

The multi modal interactive device according to the first embodiment of the invention has two sets of the input unit and the recognition unit. But, the number of sets may be changed depending upon the number of input channels. In this embodiment, two reaction generating units are provided, but the number of reaction generating units may also be increased according to the performance of the multi modal interactive device.

Therefore, according to the first embodiment of the invention, management based on an intention of a user is done so as to achieve the most proper conversation. The first embodiment of the invention can flexibly respond to the user in a natural timing related to the user.

Figure 3:
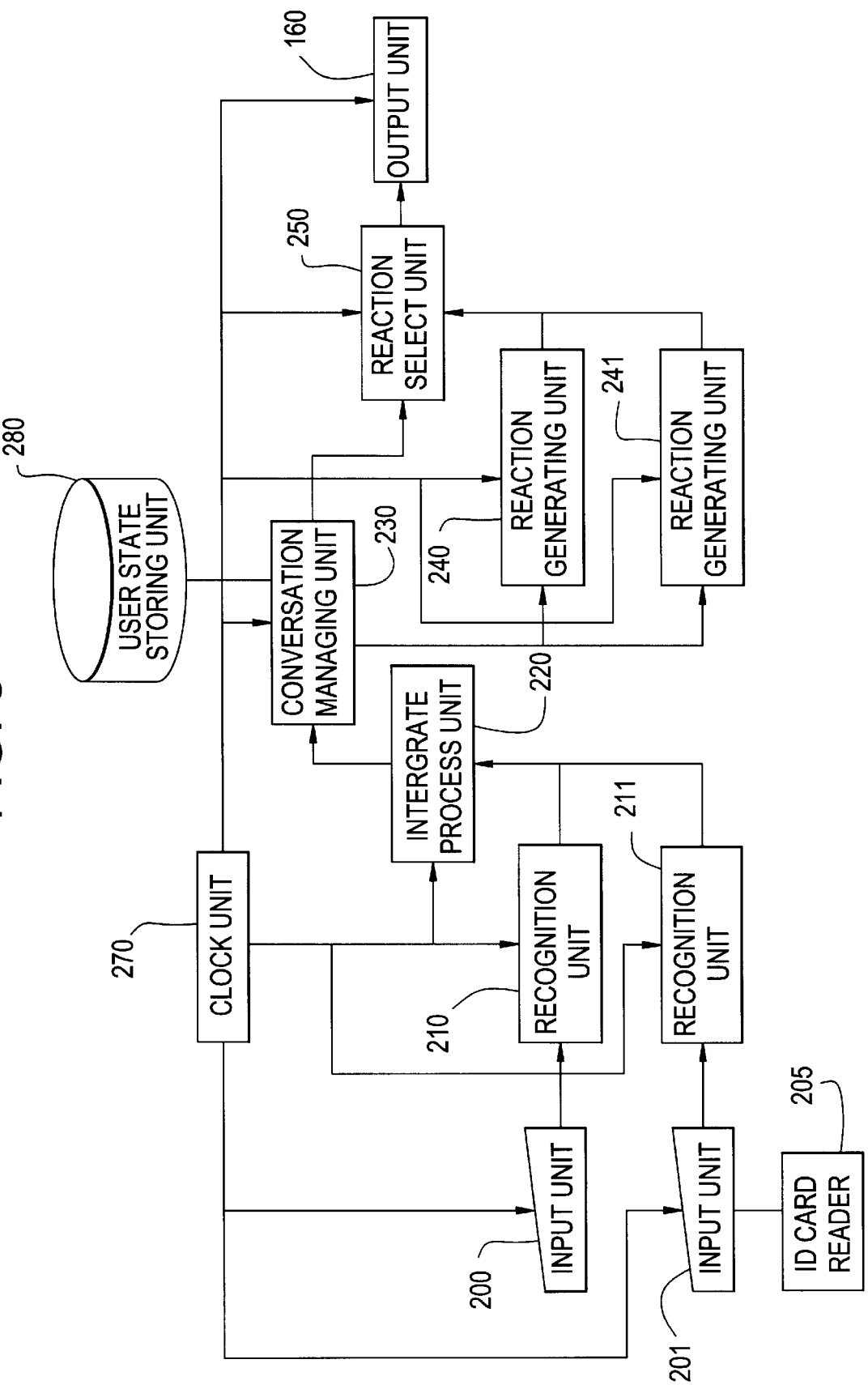
FIG. 3 shows a block diagram of a multi modal interactive device according to a second embodiment of the invention.

Next, another multi modal interactive device according to a second embodiment of the invention is explained with reference to FIG. 3.

Hereinafter, description will be mainly restricted to elements or functions which are different from the first embodiment.

The multi modal interactive device includes a first input unit 200, a second input unit 201, a first recognition unit 210, a second recognition unit 211, an integrate process unit 220, a conversation manage unit 230, a first reaction generating unit 240, a second reaction generating unit 241, a reaction select unit 250, an output unit 260, a clock unit 270, and a user state storing unit 280. Comparing with the above prior multi modal interactive device shown in FIG. 1, it will be readily understood from FIG. 3 that the first reaction generating unit 240, the second reaction generating unit 241, the reaction select unit 250, and the user state storing unit 280 are newly added.

Conscious or unconscious information which a user expresses consciously or unconsciously is supplied to the first input unit 200 and the second input unit 201. Each of the conscious information and the unconscious information includes, for example, voice signal, a location of the user., the user's eyes, an expression of the user's face, and motion of the user's body.

The first recognition unit 210 and the second recognition unit 211 is operable in accordance with an algorithm for processing or recognizing data from the corresponding input unit (the first input unit 200 or the second input unit 201), and provides a recognition result to the integrate process unit 220.

The integrate process unit 220 integrates the recognition results supplied from a plurality of recognition units in parallel and consequently determines an intention of the user.

The user state storing unit 280 stores relationships between a timing (which means a time period from a time instant when the user's action is received by the input unit to another time instant when the reaction which corresponds to the user's action is presented to the user) and a user state including age and sex of user etc.

FIG. 5 shows an example of contents of the user state storing unit 280. In the unit 280, users are classified into type 1 through type 15 each of which is determined by a user state including such as sex, age, personality, and the number of use times of the multi modal interactive device, and the most proper timing (seconds).

The conversation manage unit 230 manages the most proper conversation on the basis of the recognized intention of the user.

To generate reaction to be presented to the user, the conversation manage unit 230 supplies contents of the information to the first reaction generating unit 240 and the second reaction generating unit 241.

Here, the conversation manage unit 230 determines a limit time of selecting a reaction with reference to the timing stored in the user state storing unit 280. The conversation manage unit 230 firstly determines a state of the current user (sex, age, and the number of use times of the device) from an ID card of the user, read by ID card reader 205, or information recognized by the recognition units using image recognition software. Next, the unit 230 searches the user state storing unit 280 for a record having the same state as the determined state of the current user. When the unit 230 finds the objective record, the unit calculates the limit time from a timing stored in the record to control the reaction which corresponds to the user's action to be presented to the output unit 260 based on the timing stored in the record.

Next, the conversation manage unit 230 supplies the reaction select unit 250 with a method of selecting a reaction among reactions generated by the reaction generating units and the limit time of selecting the reaction.

The first reaction generating unit 240 and the second reaction generating unit 241 generate reactions or suspends the generating of the reactions, based on instructions from the conversation manage unit 230.

The reaction select unit 250 selects the most proper information from the reactions generated by the reaction generating units (240, 241) and generated until the limit time using the method sent from the conversation manage unit 230, and supplies the selected reaction to the output unit 260. The output unit 260 supplies the selected reaction to the user.

The clock unit 270 clocks the start time, the end time, and the time required of process executed by each of the first input unit 200, the second input unit 201, the first recognition unit 210, the second recognition unit 211, the integrate process unit 220, the conversation manage unit 230, the first reaction generating unit 240, the second reaction generating unit 241, the reaction select unit 250, and the output unit 260.

The multi modal interactive device according to the second embodiment of the invention has two sets of the input unit and the recognition unit. But, according to the number of the input channels, the number of the sets may be changed. Although two reaction generating units are provided, the number of the reaction generating units may also be increased according to performance of the multi modal interactive device.

Therefore, according to the second embodiment of the invention, a reaction which corresponds to the user's action is presented to the user on the most proper timing, and the most proper timing is determined according to the user state such as age, sex, character, and the number of use times of the multi modal interactive device, stored in the user state storing unit 280.

Figure 4:
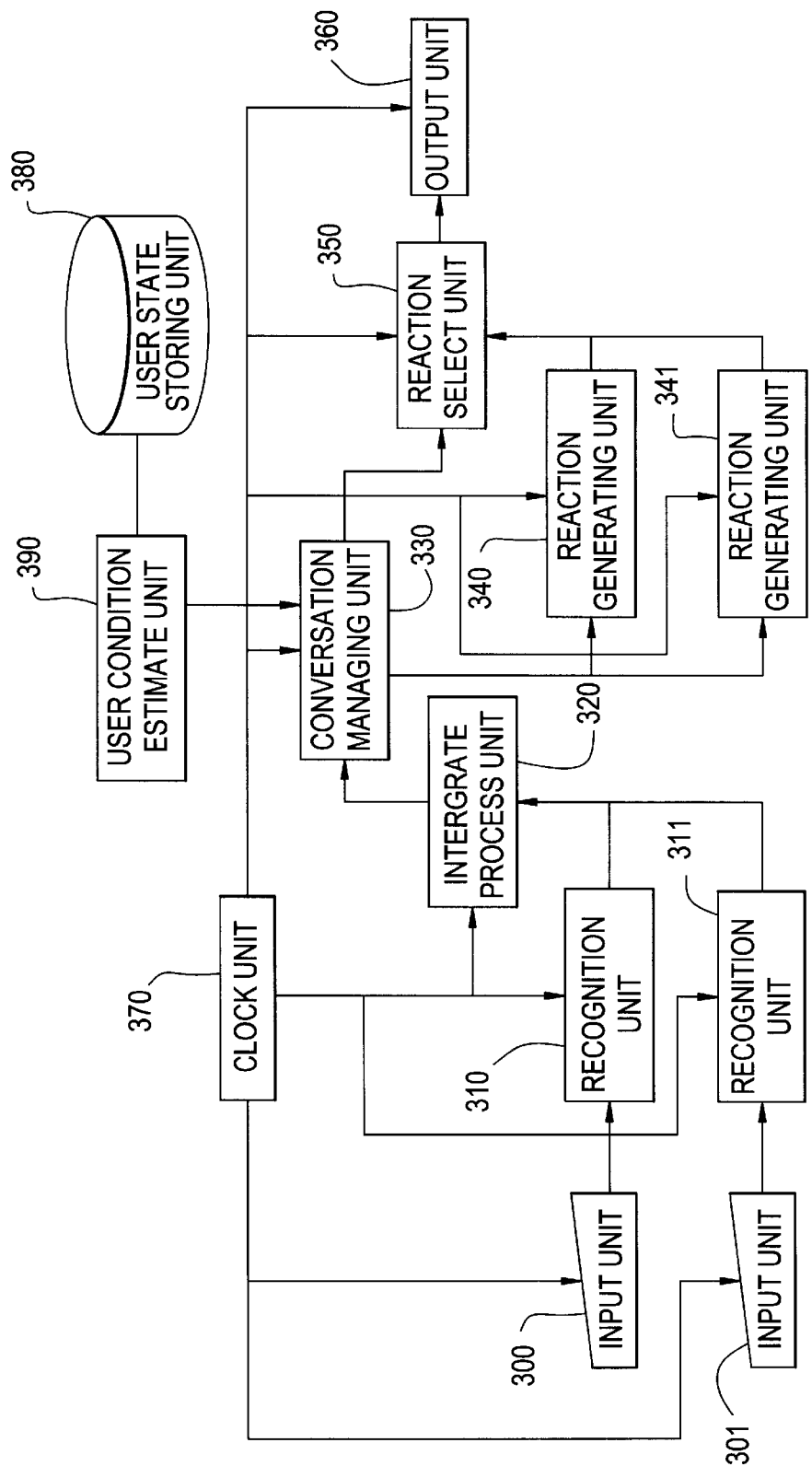
FIG. 4 shows a block diagram of a multi modal interactive device according to a third embodiment of the invention.

Finally, still another multi modal interactive device according to a third embodiment of the invention is explained with reference to FIG. 4.

Hereinafter, elements or functions which are different from the first embodiment are mainly explained.

The multi modal interactive device includes a first input unit 300, a second input unit 301, a first recognition unit 310, a second recognition unit 311, an integrate process unit 320, a conversation manage unit 330, a first reaction generating unit 340, a second reaction generating unit 341, a reaction select unit 350, an output unit 360, a clock unit 370, a user state storing unit 380, and a user condition estimate unit 390. Comparing with the above prior multi modal interactive device shown in FIG. 1, the first reaction generating unit 340, the second reaction generating unit 341, the reaction select unit 350, the user state storing unit 380, and the user condition estimate unit 390 are newly added.

Conscious or unconscious information which a user expresses consciously or unconsciously is supplied to the first input unit 300 and the second input unit 301. Each of the conscious information and the unconscious information includes, for example, a voice signal, a location of the user, the user's eyes, an expression of the user's face, and motion of the user's body.

The first recognition unit 310 and the second recognition unit 311 is operable in accordance with an algorithm for processing or recognizing data from the corresponding input unit (the first input unit 300 or the second input unit 301), and provides a recognition result to the integrate process unit 320.

The integrate process unit 320 integrates the recognition results supplied from a plurality of recognition units in parallel, and consequently recognizes an intention of the user.

The user state storing unit 380 stores relationships between a timing and a user state including age and sex of user etc.

The user condition estimate unit 390 estimates a condition of a user using static information obtained from the user state storing unit 380, and dynamic information (which is supplied by the conversation manage unit 330) including transition of user's conversation from the start of using the multi modal interactive device. For example, irritated or flurried condition of a user is estimated and according to the condition, the most proper timing is determined. More specifically, a time period is clocked in some times, from a time when a reaction is presented to the output unit 360 (to the user) to another time when the user starts action in response to the presented reaction. From the clocked time periods, a condition of the user is determined.

The conversation manage unit 330 manages the most proper conversation on the basis of the recognized intention of the user.

To generate reaction to be presented to the user, the conversation manage unit 330 supplies contents of the reaction to the first reaction generating unit 340 and the second reaction generating unit 341.

Here, the conversation manage unit 330 determines the most proper limit time with reference to the information from the user state storing unit 380 and the user condition estimate unit 390, and sends the limit time to the reaction select unit 350.

Further, the conversation manage unit 330 supplies a method to select a reaction among reactions generated by the reaction generating units, to the reaction select unit 350.

The first reaction generating unit 340 and the second reaction generating unit 341 generate reactions or suspends the generating of the reactions, based on instructions from the conversation manage unit 330.

The reaction select unit 350 selects the most proper reaction from the reactions generated by the reaction generating units (340, 341) and generates until the limit time, and supplies the selected reaction to the output unit 360.

The output unit 360 supplies the selected reaction to the user.

The clock unit 370 clocks the start time, the end time, and the time required of process executed by each of the first input unit 300, the second input unit 301, the first recognition unit 310, the second recognition unit 311, the integrate process unit 320, the conversation manage unit 330, the first reaction generating unit 340, the second reaction generating unit 341, the reaction select unit 350, and the output unit 360.

The multi modal interactive device according to the third embodiment of the invention has two sets of the input unit and the recognition unit. But, according to the number of input channels, the number of the sets may be changed. Although two reaction generating units are provided, the number of the reaction generating units may also be changed according to performance of the multi modal interactive device.

Therefore, according to the third embodiment of the invention, the most proper timing in a conversation with a user can be taken by estimating a condition of the user through a use of the user state storing unit 380 and the user condition estimate unit 390.

As described above, according to the invention, the multi modal interactive device can make a suitable conversation with a user by taking the most proper timing into the conversation on the basis of a type of the user.

What is claimed is:

1. A multi modal interactive device comprising:
   an input unit which inputs information related to a user;
   a recognition unit which recognizes the information obtained by the input unit;
   an integrate process unit which determines an intention of the user from the recognition result from the recognition unit;

a reaction generating unit which generates a reaction which corresponds to the intention of the user;

a storing device which stores a timing for each user state;

a conversation managing unit which determines a timing on the basis of the user state with reference to the storing device; and an output unit which outputs the reaction to the user based on the determined timing.

2. The multi modal interactive device of claim 1, wherein the timing is defined as a time period from a time instant when the input unit inputs the information to a time instant when the output unit outputs the corresponding reaction.

3. The multi modal interactive device of claim 1, wherein the user state includes one of sex, age, the number of use times of the multi modal interactive device, and personality of the user.

4. The multi modal interactive device of claim 3, wherein the user state is identified from the information obtained by the input unit.

5. The multi modal interactive device of claim 3, wherein the user state is identified from the ID card which is presented to the multi modal interactive device.

6. The multi modal interactive device of claim 1 further comprising:

a conversation analyze unit which analyzes a transition of a conversation between the multi modal interactive device and the user, wherein the timing determine unit determines the timing on the basis of the user state and the analyzed results.

7. The multi modal interactive device of claim 1 further comprising:

one or more additional reaction generating units; and a reaction select unit which selects a reaction to be sent to the output unit among a group of reactions from the plurality of reaction generating units, wherein the reaction select unit selects the reaction to be sent on a timing so that the reaction is presented by the output unit based on the determined timing.

8. The multi modal interactive device of claim 7, wherein each reaction in the group of reactions is generated until a predetermined time interval before the determined timing.

9. The multi modal interactive device of claim 1 further comprising:

one or more pairs of the input unit and the recognition unit, the recognition unit is related to the input unit to recognize the information from the corresponding input unit.

10. A method of providing with a multi modal conversation, the method comprising the steps of:

receiving information related to a user;

recognizing the information;

determining an intention of the user from the recognition result;

generating a reaction which corresponds to the intention of the user;

preparing a timing for each user state;

determining a timing on the basis of the user state; and supplying the user with the reaction based on the determined timing.

11. The method of claim 10, wherein two or more reactions are generated by the step of generating a reaction, and a reaction to be presented to the user is selected among the generated reactions so that the selected reaction is presented based on the determined timing.

12. A recording medium readable by a computer, tangibly embodying a program of instructions executable by the computer to perform a method of providing with a multi modal conversation, the method comprising the steps of:

receiving information related to a user;

recognizing the information;

determining an intention of the user from the recognition result;

generating a reaction which corresponds to the intention of the user;

preparing a timing for each user state;

determining a timing on the basis of the user state; and supplying the user with the reaction based on the determined timing.

* * * * *